(12) United States Patent
Yasunori

(10) Patent No.: US 11,214,258 B2
(45) Date of Patent: Jan. 4, 2022

(54) DRIVING ASSISTANCE SYSTEM AND DRIVING ASSISTANCE DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Hiromichi Yasunori, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 283 days.

(21) Appl. No.: 16/471,205

(22) PCT Filed: Dec. 4, 2017

(86) PCT No.: PCT/JP2017/043433
§ 371 (c)(1),
(2) Date: Jun. 19, 2019

(87) PCT Pub. No.: WO2018/116795
PCT Pub. Date: Jun. 28, 2018

(65) Prior Publication Data
US 2020/0086876 A1    Mar. 19, 2020

(30) Foreign Application Priority Data
Dec. 22, 2016 (JP) .............................. JP2016-249211

(51) Int. Cl.
*B60W 30/18* (2012.01)
*B60W 40/06* (2012.01)
(Continued)

(52) U.S. Cl.
CPC ...... *B60W 30/18163* (2013.01); *B60W 40/06* (2013.01); *B60W 40/105* (2013.01); *B60W 40/12* (2013.01); *B60W 2554/801* (2020.02)

(58) Field of Classification Search
CPC .............................................. B60W 30/18163
See application file for complete search history.

(56) References Cited

U.S. PATENT DOCUMENTS

2005/0231340 A1* 10/2005 Tauchi .................. B60Q 9/008
340/435

FOREIGN PATENT DOCUMENTS

| JP | 2005-326963 A | 11/2005 |
| JP | 2006-106945 A | 4/2006 |

(Continued)

OTHER PUBLICATIONS

International Search Report, Application No. PCT/JP2017/043433, dated Feb. 27, 2018. ISA/Japan Patent Office.

*Primary Examiner* — Imran K Mustafa
(74) *Attorney, Agent, or Firm* — Honigman LLP

(57) ABSTRACT

A yield amount of a vehicle is given notice of more accurately before two vehicles pass each other. In a driving assistance system, a yield amount calculation unit calculates a yield amount of a first vehicle on the basis of the width of the first vehicle, the width of a second vehicle, the current position of the first vehicle in the width direction detected by a first position detection unit, the passing position predicted by a passing position prediction unit, the road width at the passing position specified by a road width specification unit. The notification unit gives notice of the yield amount of the first vehicle at least in the first vehicle on the basis of the calculation result from the yield amount calculation unit.

9 Claims, 5 Drawing Sheets

(51) Int. Cl.
  *B60W 40/105* (2012.01)
  *B60W 40/12* (2012.01)

(56) References Cited

FOREIGN PATENT DOCUMENTS

| | | |
|---|---|---|
| JP | 2006-273000 A | 10/2006 |
| JP | 2014-021884 A | 2/2014 |
| JP | 2014-044608 A | 3/2014 |

* cited by examiner

DRIVING ASSISTANCE SYSTEM AND DRIVING ASSISTANCE DEVICE

CROSS-REFERENCE TO RELATED APPLICATIONS

This application is the U.S. national stage of PCT/JP2017/043433 filed Dec. 4, 2017, which claims priority of Japanese Patent Application No. JP 2016-249211 filed Dec. 22, 2016, the contents of which are incorporated herein.

TECHNICAL FIELD

The present disclosure relates to a driving assistance system and a driving assistance device.

BACKGROUND

JP2006-273000A discloses a vehicle driving assistance device for assisting driving when vehicles pass each other. This vehicle driving assistance device predicts a passing position where a driver's vehicle and an oncoming vehicle pass each other, and calculates a first remaining road width obtained by subtracting the width of the oncoming vehicle from the road width at the predicted passing position. Furthermore, the driving assistance device detects a preliminary passing position where a second remaining road width obtained by subtracting the width of the oncoming vehicle from the road width is not less than the width at which the driver's vehicle and the oncoming vehicle can pass each other with enough room, the detected preliminary passing position being further on the driver's vehicle side than the predicted passing position. If the first remaining road width is smaller than a caution-required width at which caution is necessary when the driver's vehicle and the oncoming vehicle pass each other and the preliminary passing position is detected, a second driving assistance control is performed such that the vehicles pass each other at the preliminary passing position.

The driving assistance device disclosed in JP2006-273000A determines whether or not passing is difficult for the vehicles at the predicted passing position, and if it is difficult, performs deceleration control to decelerate the vehicle such that the vehicles pass each other at a wider portion of the road. However, this technique includes only the idea of adjusting the position in travelling direction, and does not include the idea of finely assisting driving with respect to the road width direction. For this reason, there is a problem in that it is not easy for a driver to understand the extent by which the vehicle is to move to the side (yield) when the vehicles pass each other.

The present disclosure has been conceived in view of the above circumstances, and an object of the present disclosure is giving notification of the yield amount of a vehicle more accurately before the vehicles pass each other.

SUMMARY

A driving assistance system according to a first aspect of the disclosure includes a first width information obtaining unit for obtaining first width information that specifies a width of a first vehicle and a second width information for obtaining second width information that specifies a width of a second vehicle, which is to be passed by the oncoming first vehicle. A passing position prediction unit predicts a passing position of the first vehicle and the second vehicle in a travelling direction of the first vehicle on a road on which the first vehicle and the second vehicle run. A first position detection unit detects a current position of the first vehicle in the width direction of the road before the first vehicle and the second vehicle pass each other. A road width specification unit specifies a road width at the passing position predicted by the passing position prediction unit. A yield amount calculation unit calculates a yield amount of the first vehicle on the basis of the width of the first vehicle specified by the first width information obtained by the first width information obtaining unit, the width of the second vehicle specified by the second width information obtained by the second width information obtaining unit, the current position of the first vehicle in the width direction detected by the first position detection unit, the passing position predicted by the passing position prediction unit, and the road width specified by the road width specification unit. A notification unit for gives notification of the yield amount of the first vehicle at least in the first vehicle on the basis of the calculation result from the yield amount calculation unit.

A driving assistance device according to a second aspect of the disclosure includes a first width information obtaining unit for obtaining first width information that specifies a width of a first vehicle; and a second width information for obtaining second width information that specifies a width of a second vehicle, which is to be passed by the oncoming first vehicle. A passing position prediction unit predicts a passing position of the first vehicle and the second vehicle in a travelling direction of the first vehicle on a road on which the first vehicle and the second vehicle run. A first position detection unit detects a current position of the first vehicle in the width direction of the road before the first vehicle and the second vehicle pass each other. A road width specification unit specifies the road width at the passing position predicted by the passing position prediction unit. A yield amount calculation unit calculates a yield amount of the first vehicle on the basis of, the width of the first vehicle specified by the first width information obtained by the first width information obtaining unit, the width of the second vehicle specified by the second width information obtained by the second width information obtaining unit, the current position of the first vehicle in the width direction detected by the first position detection unit, the passing position predicted by the passing position prediction unit, and the road width specified by the road width specification unit. A notification unit gives notification of the yield amount of the first vehicle at least in the first vehicle on the basis of the calculation result from the yield amount calculation unit.

Advantageous Effects of Disclosure

According to the first and second aspects of the disclosures, the yield amount calculation unit calculates the yield amount of the first vehicle on the basis of the width of the first vehicle specified by the first width information obtained by the first width information obtaining unit, the width of the second vehicle specified by the second width information obtained by the second width information obtaining unit, the current position of the first vehicle in the width direction detected by the first position detection unit, the passing position predicted by the passing position prediction unit, and the road width specified by the road width specification unit.

If the road width at the position where the first vehicle and the second vehicle pass each other, the width of the first vehicle, and the width of the second vehicle are specified, the state (particularly, the position in the width direction) of the first vehicle when the vehicles pass each other can be estimated. Obtaining such information (information from which the state of the first vehicle when the vehicles pass each other can be understood) and current position of the first vehicle in the width direction detected by the first position detection unit makes it possible to calculate, more accurately, the amount (the first vehicle yield amount) by which the first vehicle is to move to the side while it goes from the current position to the passing position, thereby making it possible to notify the driver in the first vehicle of such yield amount.

DETAILED DESCRIPTION OF PREFERRED EMBODIMENTS

Figure 1:
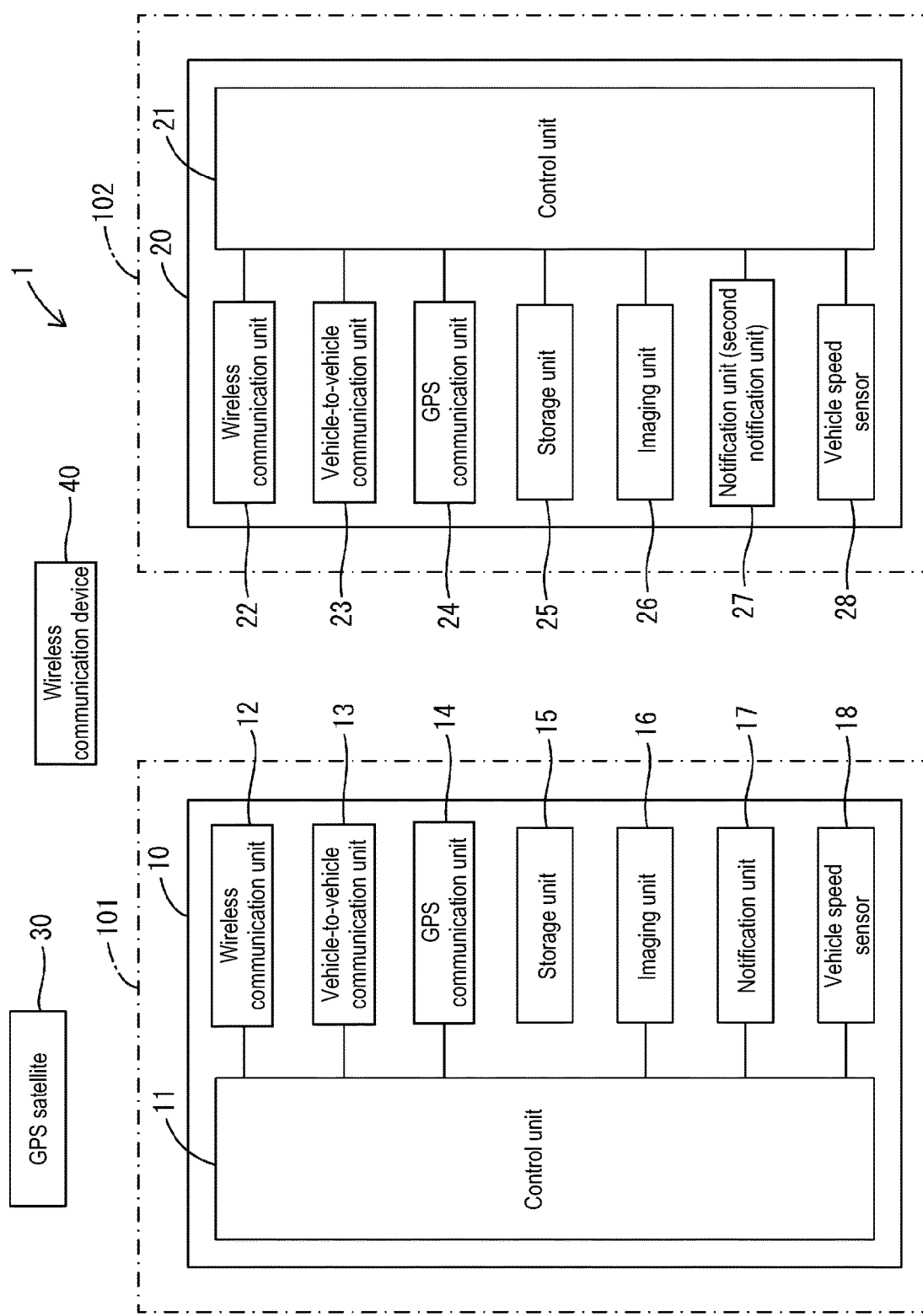
FIG. 1 is a schematic block diagram showing a driving assistance system for a vehicle according to Embodiment 1 and a relevant configuration thereof.

Hereinafter, preferred examples of the present disclosure will be illustrated.

In the first and second aspects of the disclosures, the passing position prediction unit may include an inter-vehicle (vehicle-to-vehicle) distance calculation unit for calculating a distance between the first vehicle and the second vehicle before the vehicles pass each other, a first speed detection unit for detecting the speed of the first vehicle, a second speed detection unit for detecting the speed of the second vehicle, and a position information calculation unit for calculating a position information indicating the passing position on the basis of the inter-vehicle distance calculated by the inter-vehicle distance calculation unit, the speed of the first vehicle detected by the first speed detection unit, and the speed of the second vehicle detected by the second speed detection unit.

In this way, the passing position prediction unit obtains the inter-vehicle distance between the first vehicle and the second vehicle and then estimates the passing position. Accordingly, the position at which the first vehicle and second vehicle will pass each other can be specified more accurately. As a result, the road width specification unit and the yield amount calculation unit can calculate, more accurately, the road width at the passing position, the yield amount of the first vehicle, and the like.

The first and second aspects of the disclosures may include a determination unit for determining whether the first vehicle and second vehicle will be in a predetermined state in which the vehicles can pass each other at the passing position, on the basis of the width of the first vehicle specified by the first width information obtained by the first width information obtaining unit, the second width of the second vehicle specified by the second width information obtained by the second width information obtaining unit, the passing position predicted by the passing position prediction unit and the road width specified by the road width specification unit. The notification unit may give a notification according to the determination result by the determination unit if at least the determination unit determines that the vehicles will not be in a predetermined state in which the vehicles can pass each other.

According to the present disclosure, the determination unit can determine, more accurately, whether or not the first vehicle and the second vehicle will be in a predetermined state in which the vehicles can pass each other, and the notification unit can notify the result. If the vehicles will not be in a predetermined state in which the vehicle can pass each other, the notification thereof is performed, and therefore the driver who understands the notification can readily take an appropriate action.

In the first and second aspects of the disclosures, the first position detection unit may detect a first current width, which is a distance between the first vehicle side-edge of the road in the width direction and the first vehicle before the first vehicle and the second vehicle pass each other. The yield amount calculation unit may calculate the yield amount of the first vehicle on the basis of the remainder value obtained by subtracting the width of the first vehicle and the width of the second vehicle from the road width at the passing position, and the first current width detected by the first position detection unit.

According to the present disclosure, the first position detection unit can detect the first current width (distance between the first vehicle and the edge of the road in the width direction on the side of the first vehicle) before the first vehicle and the second vehicle pass each other. As such, the yield amount calculation unit can obtain the distance between the road edge and the first vehicle before the vehicles pass each other more accurately, and thus can calculate the yield amount of the first vehicle more accurately on the basis of the amount of remaining space when the vehicles pass each other (the remainder value obtained by subtracting the width of the first vehicle and the width of the second vehicle from the road width at the passing position).

The first aspect of the disclosure may include a second position detection unit for detecting the current position of the second vehicle in the road in the width direction before the first vehicle and the second vehicle pass each other, a second yield amount calculation unit for calculating the yield amount of the second vehicle on the basis of the width of the first vehicle specified by the first width information obtained by the first width information obtaining unit, the width of the second vehicle specified by the second width information obtained by the second width information obtaining unit, and the current position of the second vehicle in the width direction detected by the second position detection unit, and the passing position predicted by the passing position prediction unit, and the road width specified by the road width specification unit, and the second notification unit for giving notification of the yield amount of the second vehicle at least in the second vehicle.

Specifying the road width at the position where the first vehicle and the second vehicle pass each other, the width of the first vehicle, and the width of the second vehicle makes it possible to estimate the state of the second vehicle (especially, the position in the width direction) when the vehicles pass each other. Then, obtaining such information (information from which the state of the second vehicle when the vehicles pass each other can be obtained) and the current position of the second vehicle in the width direction detected by the second position detection unit makes it possible to calculate, more accurately, the amount (the yield amount of the second vehicle) by which the second vehicle is to move to the side while it goes from the current position to the passing position, and thus it is possible to notify the driver of the second vehicle of such yield amount.

In the first aspect of the disclosure, the second position detection unit may detect a second current width, which is a distance between the second vehicle and the edge of the road in the width direction on the side of the second vehicle, before the first vehicle and the second vehicle pass each other. The second yield amount calculation unit may calculate the yield amount of the second vehicle on the basis of the remainder value obtained by subtracting the width of the first vehicle and the width of the second vehicle from the road width at the passing position, and the second current width detected by the second position detection unit.

According to this disclosure, the second current width (distance between the second vehicle and the edge of the road in the width direction on the side of the second vehicle) can be detected by the second position detection unit before the first vehicle and the second vehicle pass each other. As such, the second yield amount calculation unit can obtain the distance between the road edge and the second vehicle before the vehicles pass each other more accurately, and thus can calculate the yield amount of the second vehicle more accurately on the basis of the amount of remaining space (the remainder value obtained by subtracting the width of the first vehicle and the width of the second vehicle from the road width at the passing position).

Embodiment 1

Hereinafter, Embodiment 1 in which the present disclosure is embodied will be illustrated.

The driving assistance system shown in FIG. 1 has a configuration in which a plurality of on-board devices are respectively provided in a plurality of vehicles. Hereinafter, a description will be given taking as an example a driving assistance system 1 that includes a driving assistance device 10 provided in a first vehicle 101 and a second assistance device 20 provided in a second vehicle 102.

The driving assistance system 1 is configured as a system that can assist driving of at least the first vehicle 101, and in the example shown in FIG. 1 for example, it is a system that can assist driving of both the first vehicle 101 and the second vehicle 102. Note, that although a single second vehicle 102 is illustrated as a typical example in the example shown in FIG. 1, more second vehicles 102 including second assisting devices 20 may be present.

As shown in FIG. 1, the driving assistance device 10 provided in the first vehicle 101 includes a control unit 11, a wireless communication unit 12, a vehicle-to-vehicle communication unit 13, a GPS communication unit 14, a storage unit 15, an imaging unit 16, a notification unit 17, and a vehicle speed sensor 18. Note, that the driving assistance device 10 may include a single electronic control device or a plurality of electronic control devices.

The control unit 11 is configured as an information processing device (e.g. a microcomputer) including a CPU, a memory, and the like, for example. The control unit 11 has a function of performing communication in cooperation with the wireless communication unit 12, the vehicle-to-vehicle communication unit 13, the GPS communication unit 14, and the like. The control unit 11 has functions of reading from/writing to the storage unit 15, performing processing such as storing and analyzing images obtained by imaging with the imaging unit 16, and also causing the notification unit 17 to give a notification, or the like.

The wireless communication unit 12 is a device for performing wireless communication with external information apparatuses, and constituted by one or a plurality of communication devices. The wireless communication unit 12 may be configured to perform wireless communication with external apparatuses in accordance with any communication method, or may include a plurality of communication apparatuses configured to be capable of performing wireless communication in accordance with different communication methods so as to perform wireless communication in accordance with the plurality of communication method. The wireless communication unit 12 performs wireless communication with external apparatuses in accordance with a wireless communication method compliant with a known wireless communication standard such as the LTE (Long Term Evolution) standard, the IMT-2000 standard (International Mobile Telecommunication 2000, the so-called 3G communication standard), the dedicated short-range communication (DSRC) system standard, or the like.

The vehicle-to-vehicle communication unit 13 is configured as a device for performing known vehicle-to-vehicle communication with the second vehicle 102 located near the first vehicle 101 (in a distance in which the vehicle-to-vehicle communication unit 13 can perform communication). The vehicle-to-vehicle communication unit 13 performs inter-vehicle communication with a vehicle-to-vehicle communication unit 23 provided in the second vehicle 102, and is capable of transmitting information to the vehicle-to-vehicle communication unit 23 and receiving information from the vehicle-to-vehicle communication unit 23. Configured to communicate in this way, it is possible to transmit information held in the second vehicle 102 to the first vehicle 101, and similarly, it is also possible to transmit information held in a first vehicle 101 to the second vehicle 102.

The method for performing vehicle to-vehicle communication between the vehicle-to-vehicle communication unit 13 and the vehicle-to-vehicle communication unit 23 can be a known method with which wireless communication is possible. Also, for the vehicle-to-vehicle communication between the vehicle-to-vehicle communication unit 13 and the vehicle to-vehicle communication unit 23, it is also possible to use a method in which wireless communication is performed directly without interposing an external device, a method in which information is transmitted from the vehicle-to-vehicle communication unit 13 to the vehicle-to-vehicle communication unit 23 via an external device, a method in which information is transmitted from the vehicle-to-vehicle communication unit 23 to the vehicle-to-vehicle-communication unit 13 via an external device, or the like.

The GPS communication unit 14 is configured as a known GPS communication device that is capable of communicating with a GPS satellite 30. The GPS communication unit 14, for example, obtains position information (GPS position information) that specifies the position of the first vehicle 101 by performing communication with the GPS satellite 30. The control unit 11 functions as a position detection unit, and can calculate the position (specifically, latitude and longitude or the like) of the first vehicle 101 on the basis of the position information (GPS position information) obtained by the GPS communication unit 14.

The storage unit 15 is constituted by one or multiple kinds of storage devices such as a ROM, a RAM, a known semiconductor memory such as a non-volatile memory, or other storage devices.

The storage unit 15 stores map data in which positions of roads and buildings can be specified in association with latitude and longitude, thereby forming a map database. The map database formed by the storage unit 15 is map data used in a car navigation system, which stores, for example, roadmap data of all over Japan, facility data on various kinds of facilities and shops, and the like, in association with the roadmap data. Furthermore, in this configuration, road width data indicating the road widths at the positions associated with the positions of the roads is included in the roadmap data stored in the storage unit 15. Specifically, for example, the roadmap data is formed by dividing roads that are present in the areas (map-covered areas) that can be expressed by the roadmap data, into multiple regions, and is data in which the road width is associated with each of these areas. In other words, the roadmap data has a configuration in which, if the position of the road is specified, the road width at that position can be specified.

The imaging unit 16 is configured as a known onboard camera such as a CCD camera, a CMOS camera, or the like, and captures images in a predetermined imaging range set outside of the first vehicle 101. The imaging unit 16 is constituted by one or a plurality of onboard cameras, and at least one onboard camera is arranged so as to be capable of imaging the region in front of the first vehicle 101. When the first vehicle 101 is driving on a straight road along the road direction, for example, an imaging range is set in which at least the region in front of and below the first vehicle 101 can be imaged, such that the area in front of the first vehicle 101 on the road can be imaged.

The notification unit 17 is constituted by a sounding device such as a speaker or a buzzer, or a display device such as a lamp or a display portion, and gives notification by sound, light, images, or the like. Specifically, the notification unit 17 includes both a sounding device and a display device such that image display and sound notification are capable.

The vehicle speed sensor 18 is constituted by a known vehicle speed sensor that can detect the vehicle speed of the first vehicle 101. The vehicle speed sensor 18 outputs a signal indicating the vehicle speed of the first vehicle 101, and the control unit 11 obtains the speed of the first vehicle 101 from the vehicle speed signal output from the vehicle speed sensor 18.

The GPS (Global Positioning System) satellite 30 is a known GPS artificial satellite used in the GPS system, and actually there are a plurality of GPS satellites. In this configuration, the driving assistance device 10 and the second assistance device 20 each can specify their position (e.g. specify their latitude and longitude) using the GPS system.

The wireless communication device 40 is a wireless communication device such as a base station, an access point, or the like, that is installed outside of the first vehicle 101 and the second vehicle 102, and that can perform wireless communication with the wireless communication unit 12 of the first vehicle 101 and the wireless communication unit 22 of the second vehicle 102.

In this configuration, the control unit 11 and the notification unit 17 can function as known navigation devices. Specifically, the GPS communication unit 14, the control unit 11, the vehicle speed sensor 18, and the like function as a position detection unit for detecting (positioning) the current position of the driver's vehicle (the first vehicle 101) based on the electromagnetic waves transmitted from the GPS satellite 30. The position detection unit further includes a device such as a gyrosensor for detecting the rotation angle of the driver's vehicle. The control unit 11 detects the current position (absolute position), traveling direction, speed, travel distance, current time, and the like of the driver's vehicle (the first vehicle 101) based on the input from the sensors and the like, using the software configuration and hardware configuration.

The control unit 11 can realize a location functionality of displaying, on the screen of the display device that is part of the notification unit 17, the roadmap around the vehicle and the current position (and the traveling direction) of the vehicle in an overlapped manner, on the basis of the current position of the vehicle (the first vehicle 101) that is specified by the functionality of the location detection unit, and the map data obtained from the above-mentioned map database.

As shown in FIG. 1, the second assistance device 20 provided in the second vehicle 102 includes a control unit 21, a wireless communication unit 22, the vehicle-to-vehicle communication unit 23, a GPS communication unit 24, a storage unit 25, an imaging unit 26, a notification unit 27, and a vehicle speed sensor 28. Note, that the driving assistance device 10 may include a single electronic control device, or a plurality of electronic control devices. The second assistance device 20 has a similar configuration as the driving assistance device 10 in terms of hardware. In other words, the control unit 21, the wireless communication unit 22, the vehicle-to-vehicle communication unit 23, the GPS communication unit 24, the storage unit 25, the imaging unit 26, the notification unit 27, and the vehicle speed sensor 28 that constitute the second assistance device 20 each have the same configuration as the control unit 11, the wireless communication unit 12, the vehicle-to-vehicle communication unit 13, the GPS communication unit 14, the storage unit 15, the imaging unit 16, the notification unit 17, and the vehicle speed sensor 18, that form the driving assistance device 10, respectively, and have the same functions (i.e. the same functions of the devices) as mentioned above.

Next, the passing control performed by the driving assistance device 10 will be described, mainly with reference to FIGS. 2 and 3.

Figure 2:
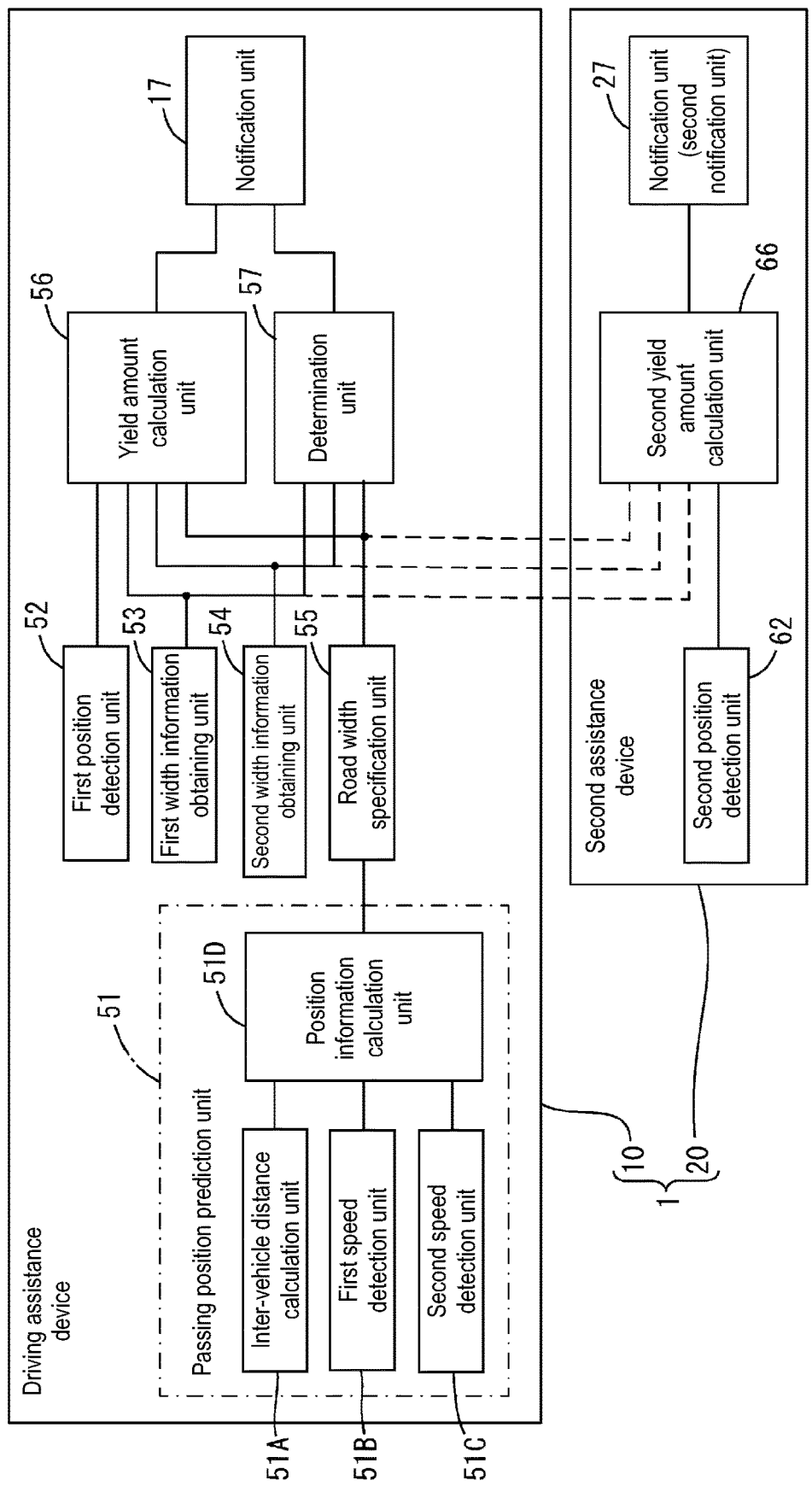
FIG. 2 is a functional block diagram illustrating a relationship between functions implemented by the driving assistance system for a vehicle according to Embodiment 1.

FIG. 2 is a functional block diagram illustrating a relationship between the functions performed in the driving assistance system 1. Specifically, FIG. 2 shows a functional block diagram illustrating a coordination between the functions performed in the driving assistance device 10, and a functional block diagram illustrating a coordination between the functions performed in the second assistance device 20. Note, that the functions performed in the driving assistance system 1 may be implemented by software processing using an information processing device, or implemented by hardware circuits. In addition, the functions may be implemented by separate devices, or a plurality of functions may be implemented by a common device.

In FIG. 2, a first width information obtaining unit 53 has a function of specifying the width of the first vehicle 101. A second width information obtaining unit 54 has a function of obtaining second width information that specifies the width of the second vehicle 102, that is to be passed by the first vehicle 101. The first position detection unit 52 has a function of detecting the current position of the first vehicle 101 on the road in the width direction before the first vehicle 101 and the second vehicle 102 pass each other. Specifically, the first position detection unit 52 detects a first current width, that is a distance between the first vehicle 101 and the edge of the road in the width direction on the first vehicle 101 side before the first vehicle 101 and the second vehicle 102 pass each other.

The passing position prediction unit 51 has a function of predicting the passing position at which the first vehicle 101 and the second vehicle 102 will pass each other, in the direction in which the first vehicle 101 is traveling, on the road on which the first vehicle 101 and the second vehicle 102 run. The passing position prediction unit 51 includes an inter-vehicle distance calculation unit 51A, a first speed detection unit 51B, a second speed detection unit 51C, and a position information calculation unit 51D. The inter-vehicle distance calculation unit 51A has a function of calculating the inter-vehicle distance between the first vehicle 101 and the second vehicle 102 before the first vehicle 101 and the second vehicle 102 pass each other. The first speed detection unit 51B has a function of detecting the speed of the first vehicle 101. The second speed detection unit 51C has a function of detecting the speed of the second vehicle 102. The position information calculation unit 51D has a function of calculating position information indicating the passing position on the basis of the inter-vehicle distance calculated by the inter-vehicle distance calculation unit 51A, the speed of the first vehicle 101 detected by the first speed detection unit 51B, and the speed of the second vehicle 102 detected by the second speed detection unit 51C.

A road width specification unit 55 has a function of specifying the road width at the passing position predicted by the passing position prediction unit 51.

A yield amount calculation unit 56 has a function of calculating the yield amount of the first vehicle 101 on the basis of the width of the first vehicle 101 specified by the first width information obtained by the first width information obtaining unit 53, the width of the second vehicle 102 specified by the second width information obtained by the second width information obtaining unit 54, the current position of the first vehicle 101 in the width direction detected by the first position detection unit 52, the passing position predicted by the passing position prediction unit 51, and the road width specified by the road width specification unit 55.

A determination unit 57 has a function of determining whether the first vehicle 101 and the second vehicle 102 will be in a predetermined state in which the vehicles can pass each other at the passing position on the basis of the width of the first vehicle 101 specified by the first width information obtained by the first width information obtaining unit 53, the width of the second vehicle 102 specified by the second width information obtained by the second width information obtaining unit 54, the passing position predicted by the passing position prediction unit 51, and the road width specified by the road width specification unit 55.

The notification unit 17 gives notice of the yield amount of the first vehicle 101, at least in the first vehicle 101, on the basis of the calculation result from the yield amount calculation unit 56. Also, at least if the determination unit 57 determines that the vehicles cannot pass each other at the passing position, the notification unit 17 gives a notification of this in accordance with the determination result from the determination unit 57.

In the second assistance device 20, a second position detection unit 62 detects the current position of the second vehicle in the width direction of the road before the first vehicle 101 and the second vehicle 102 pass each other.

A second yield amount calculation unit 66 calculates the yield amount of the second vehicle 102 on the basis of the width of the first vehicle 101 specified by the first width information obtained by the first width information obtaining unit 53, the width of the second vehicle specified by the second width information obtained by the second width information obtaining unit 54, the current position of the second vehicle 102 in the width direction detected by the second position detection unit 62, the passing position predicted by the passing position prediction unit 51, and the road width specified by the road width specification unit 55.

The second notification unit 27 gives notice of the yield amount of the second vehicle 102 at least in the second vehicle 102, on the basis of the calculation result from the second yield amount calculation unit 66.

Next, the implementation of the above-described functions will be illustrated with reference to the flowchart shown in FIG. 3. The control unit 11 of the driving assistance device 10 repeatedly performs the control shown in FIG. 3, for example, when the first vehicle 101 is in an operation state (e.g. when an ignition switch of the first vehicle 101 is ON).

Figure 3:
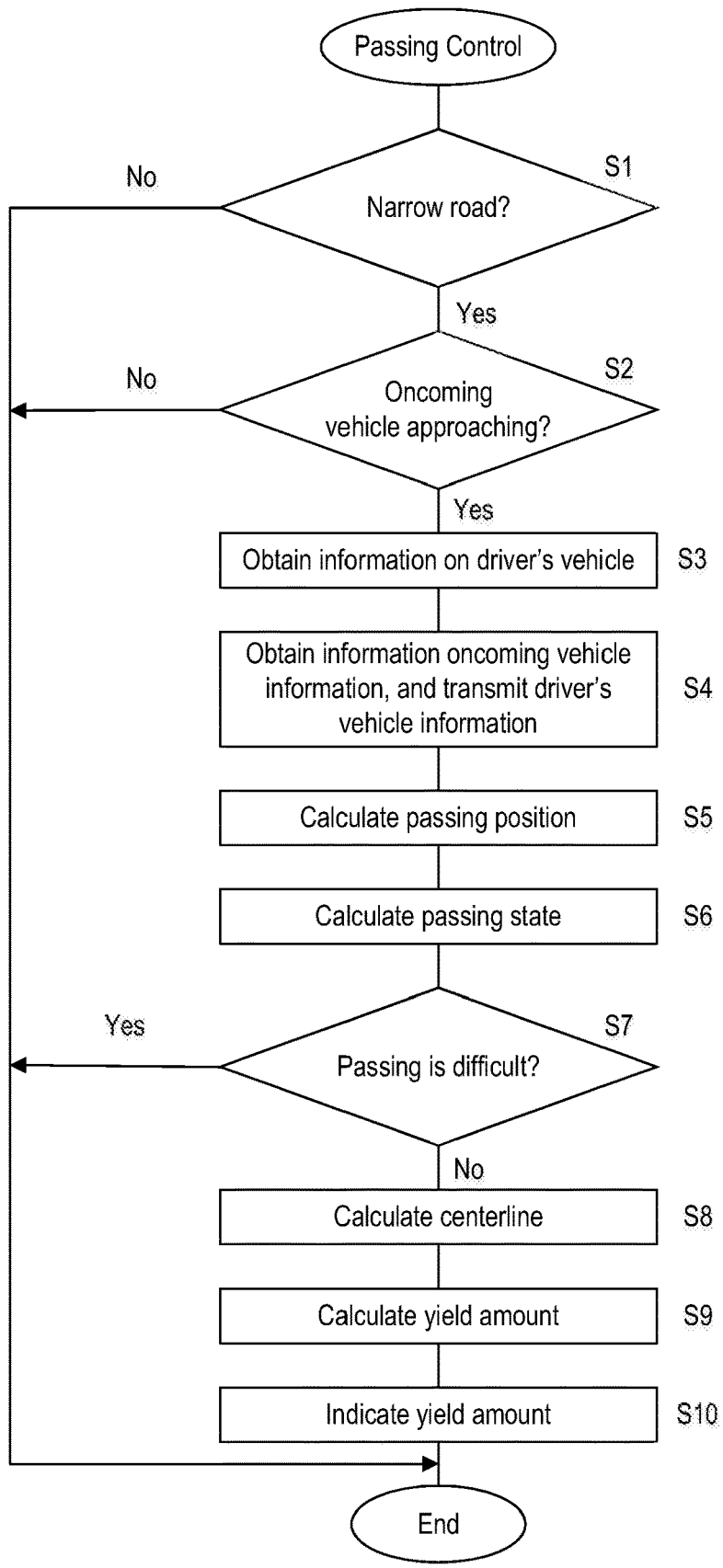
FIG. 3 is a flowchart illustrating a flow of a passing control executed by the driving assistance device for a vehicle according to Embodiment 1.

Upon starting the control shown in FIG. 3, the control unit 11, first determines whether or not the road on which the first vehicle 101 is running is a narrow road that is narrower than a predetermined width (step S1). At the time of performing step S1, for example, the control unit 11 specifies the current position (latitude and longitude) of the first vehicle 101 on the map on the basis of the result of communication performed by the GPS communication unit 14. Then, the control unit 11 confirms the road width in a given range in the traveling direction of the first vehicle 101 from the specified current position (the position of the first vehicle 101 at the time of performing step S1), on the basis of the above-described roadmap data stored in the storage unit 15. The control unit 11 determines whether or not there is a piece of road having a value less than a predetermined value in a given range from the current position (position of the first vehicle 101 at the time of performing step S1) of the first vehicle 101 on the road displayed on the roadmap data, and if there is not (step S1: No), the control unit 11 determines that the road is not narrow in step S1 and ends the processing in FIG. 3. In other words, if the nearest piece of the road on which the first vehicle 101 is about to run has a certain width, then the control unit 11 ends the control in FIG. 1 without performing the assist control which is to be performed in step S10, for example.

On the other hand, if there is a piece of road having a value less than a predetermined value in the given range from the current position specified at the time of performing step S1 (step S1: Yes), in other words, if the next piece of the road on which the first vehicle 101 is about to run is narrow, then, in step S2, the control unit 11 determines whether or not an oncoming vehicle (the second vehicle 102) is approaching in front of the first vehicle 101. In step S2, the control unit 11 determines the approaching of the second vehicle 102 by, for example, determining whether a vehicle-to-vehicle communication unit 23 of a second vehicle 102 is in the range in which communication can be performed by the vehicle-to-vehicle communication unit 13. Specifically, the control unit 11 tries to communicate with the vehicle-to-vehicle communication unit 23 of the second vehicle 102 using the vehicle-to-vehicle communication unit 13, and if the communication is successful between the vehicle-to-vehicle communication unit 13 and the vehicle-to-vehicle communication unit 23, in step S2, the control unit 11 determines that a second vehicle 102 is approaching, moves to Yes in step S2, and performs the processing of step S3. In contrast, if communication is not successful between the vehicle-to-vehicle communication unit 13 and the vehicle-to-vehicle communication unit 23 in step S2, then the control unit 11 determines that no second vehicle 102 is approaching, moves to No in step S2, and ends the control in FIG. 3. Note, that when it is determined whether a second vehicle 102 is approaching in front of the first vehicle 101 using this method, it is desirable that the vehicle-to-vehicle communication unit 13 is configured such that a communication area is formed in a given range in front of the first vehicle 101, and similarly, vehicle-to-vehicle communication unit 23 is configured such that a communication area is formed in a given range in front of the second vehicle 102.

In the example shown here, it is determined whether or not an oncoming vehicle (the second vehicle 102) is approaching in front of the first vehicle 101. However, it may also be determined whether the second vehicle 102 is approaching on the basis of images captured by the imaging unit 16 provided in the first vehicle 101. A configuration is also possible in which, at the time of performing step S2, the road area and the area of an object that is present on the road are specified by analyzing the images captured by the imaging unit 16, and if there is an object having a predetermined width (an object having a width the ratio of which to the road area is within a given range), it is determined that a second vehicle 102 is approaching, and if not, it is determined that no second vehicle 102 is approaching, for example. Alternatively, a configuration is also possible in which the first vehicle 101 is provided with a miliwave radar, a laser radar, or the like, by which it is determined whether or not there is a second vehicle 102 within a given range in front of the first vehicle 101.

If the control unit 11 determines that a second vehicle 102 is approaching in step S2 and moves to step S3, the control unit 11 obtains the driver's vehicle information (i.e. information on the first vehicle 101). The control unit 11 obtains, for example, the width information indicating the width of the first vehicle 101, information indicating the position P1 of the first vehicle 101, and information indicating the speed of the first vehicle 101. The storage unit 15 stores the first width information specifying the width Wa of the first vehicle 101, and the control unit 11 reads out and obtains the first width information from the storage unit 15. Information indicating the position P1 of the first vehicle 101 (information indicating the current position of the first vehicle 101, such as latitude and longitude) is obtained by the above-described function of the position detection unit. Information indicating the speed Va of the first vehicle 101 is obtained from the vehicle speed sensor 18. By performing the processing of step S3, the control unit 11 can specify the width Wa (vehicle width) of the first vehicle 101, the current position of the first vehicle 101 at the time of performing step S3, and the speed Va of the first vehicle 101 at the time of performing step S3.

In this configuration, the control unit 11 functions as an example of the first width information obtaining unit 53, and has a function of obtaining the first width information that specifies the width of the first vehicle 101.

The control unit 11 specifies the current position P1 of the first vehicle 101 by performing step S3. At this time, the control unit 11 detects a first current width Da that is a distance (distance in the road width direction) between the first vehicle 101 and the edge of the road in the width direction on the side of the first vehicle 101.

Figure 4:
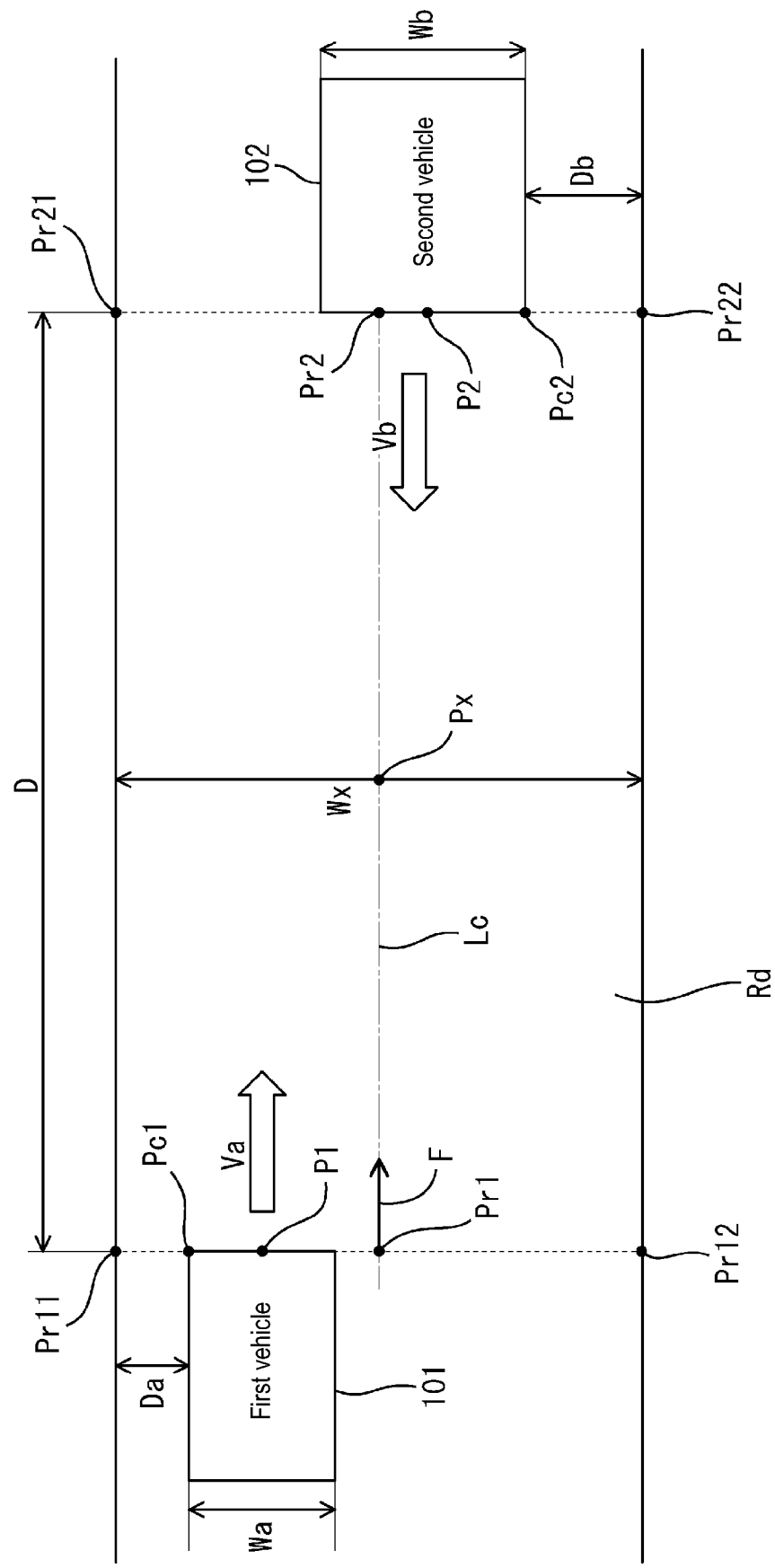
FIG. 4 is a diagram illustrating a state before a first vehicle and a second vehicle pass each other.

Various methods for detecting the first current width Da are conceivable, for example, the following method can be used. The example in FIG. 4 conceptually shows a state of the first vehicle 101 when the control unit 11 performs processing of step S3, and the like. As shown in FIG. 4, for example, in step S3, if the position P1 of the first vehicle 101 (in the example of FIG. 4, the position of the center in the width direction of the front end of the first vehicle 101) is specified by the position detection unit, the position Pr1 that is closest to the position P1 is specified on the center line Lc of the road Rd that is specified from the roadmap data. It is assumed that the road map data includes data specifying the position of the center line Lc of the road Rd, and data specifying the road width at each position of the center line Lc. Then, defining the direction orthogonal to the direction Fr of the road Rd at the position Pr1 as the width direction of the road Rd, the two edge positions on the road Rd with respect to the position Pr1 are specified (in the example in FIG. 4, these are the positions of the edges of the road through which the straight line passes, that runs in the direction orthogonal to the direction Fr and that passes through the position Pr1). If the direction of the center line Lc is the direction Fr at the position Pr1 and the road width is denoted as Wr, for example, then the positions Pr11 and Pr12 obtained by shifting the position Pr1 toward the two opposite sides in the direction orthogonal to the direction Fr by the distance Wr/2 for each, are the two edge positions of the road Rd in the width direction with respect to the position Pr1, and also the two edge positions of the road Rd in the width direction with respect to the position P1. In step S3, the control unit 11 determines the distance Da between the position Pr11 and the position Pc1 in the direction orthogonal to the direction of Fr; herein, out of the positions Pr11 and Pr12 specified as above, the position Pr11 (the position that is closer to the position P1) on the side (left side) to which the first vehicle 101 is closer is regarded as the road edge to the side of the first vehicle 101, and the position Pc1 obtained by shifting the position P1 toward the position Pr11 in the direction orthogonal to the direction Fr by the distance Wa/2 is regarded as the edge position (left end position) of the first vehicle 101 in the width direction on the side of the position Pr11. This distance Da is the first current width.

In this configuration, the control unit 11 functions as an example of the first position detection unit 52. The control unit 11 has a function of detecting the current position of the first vehicle 101 in the width direction of the road Rd before the first vehicle 101 and the second vehicle 102 pass each other. Specifically, the control unit 11 detects the first current width Da, that is a distance between the first vehicle 101 and the edge Pr11 of the road in the width direction on the side of the first vehicle 101 (specifically, the distance in the width direction between the position Pr11 and the width-direction edge Pc1).

In step S4 after step S3, the control unit 11 transmits, to the second vehicle 102, information on the width Wa (vehicle width) of the first vehicle 101 obtained in step S3, the current position P1 of the first vehicle 101 at the time of performing step S3, and the speed Va of the first vehicle 101 at the time of performing step S3. The information is transmitted through wireless communication between the vehicle-to-vehicle communication unit 13 and the vehicle-to-vehicle communication unit 23.

Here, the control of the second vehicle 102 that is the oncoming vehicle will be described.

In the first vehicle 101, the control in FIG. 3 is performed and processing of steps S1 to S3 is performed. In the second vehicle 102, the same control as in FIG. 3 is performed as well. The control unit 21 of the second vehicle 102 repeatedly performs the same control as in FIG. 3 during the operation of the vehicle. First, the control unit 21 performs determination processing (first processing) that is the same as in step S1, and determines whether or not the road on which the second vehicle 102 is about to run is a narrow road whose width is less than a predetermined width. If the road is determined to be a narrow road in the first processing, in other words, if it is "Yes", then the same determination processing (second processing) as in step S2 is performed. In the second processing, it is determined whether or not the oncoming car (for example, in the case as shown in FIG. 4, the first vehicle 101) is approaching by the same method as in the first vehicle 101. If it is determined that the oncoming car (the first vehicle 101) is approaching, in other word, if it is "Yes", then the same obtaining processing (third processing) as in step S3 is performed, and information on the driver's vehicle (the second vehicle 102) is obtained.

When the control unit 21 of the second vehicle 102 performs the same third processing as in step S3 in the case as shown in FIG. 4, for example, the control unit 21 obtains width information indicating the width Wb of the second vehicle 102, information indicating the position P2 of the second vehicle 102, and information indicating the speed Vb of the second vehicle 102. The storage unit 25 stores the second width information specifying the width Wb of the second vehicle 102, and the control unit 21 reads out the second width information from the storage unit 25. Information indicating the position P2 of the second vehicle 102 (information indicating the current position of the second vehicle 102, such as latitude and longitude) is obtained by the above-described function as the position detection unit that is provided the same as in the first vehicle 101. Information indicating the speed Vb of the second vehicle 102 is obtained from the vehicle speed sensor 28. By performing the third processing that is the same as in step S3, the control unit 21 can specify the width Wb (vehicle width) of the second vehicle 102, the current position P2 of the second vehicle 102 at the time of performing the third processing (in the example shown in FIG. 4, the position of the center in the width direction of the front end of the second vehicle 102), and the speed Vb of the second vehicle 102 at the time of performing the third processing. After that, the control unit 21 specifies the position Pr2 on the center line Lc that is closest to the position P2 on the center line Lc of the road Rd specified by the roadmap data, through the same method as that performed by the first vehicle 101 in step S3. Then, the control unit 21 specifies the edges Pr21 and Pr22 in the width direction of the road Rd at this position Pr2. Also, through the same method as that performed by the first vehicle 101 in step S3, the control unit 21 specifies the left edge Pc2 of the second vehicle 102, and detects the distance Db between the Pc2 and Pr22 as the second current width, which is the distance between the second vehicle 102 and the edge of the road Rd in the width direction on the side of the second vehicle 102.

The control unit 21 of the second vehicle 102 performs the same processing (fourth processing) as in step S4 after performing the same third processing as in step S3, then transmits, to the first vehicle 101, information indicating the width Wb (vehicle width) of the second vehicle 102 obtained in the third processing, the current position P2 of the second vehicle 102 at the time of performing the third processing, the speed Vb of the second vehicle 102 at the time of performing the third processing. The information is transmitted through wireless communication between the vehicle-to-vehicle communication unit 13 and the vehicle-to-vehicle communication unit 23.

In this way, information including the width Wb (vehicle width) of the second vehicle 102, the current position P2 of the second vehicle 102, and the speed Vb of the second vehicle 102 is transmitted from the second vehicle 102, and the control unit 11 of the first vehicle 101 obtains the information in step S4. On the other hand, information including the width Wa (vehicle width) of the first vehicle 101, the current position P1 of the first vehicle 101, and the speed Va of the first vehicle 101 is transmitted from the first vehicle 101, and the control unit 21 of the second vehicle 102 obtains the information by the same processing (fourth processing) as in step S4.

In this configuration, the control unit 11 and the vehicle-to-vehicle communication unit 13 function as an example of the second width information obtaining unit 54, and function so as to obtain the second width information specifying the width Wb of the second vehicle 102 that is to be passed by the oncoming first vehicle 101.

In the above-described example, a case was shown in which the second width information specifying the width Wb of the second vehicle 102 is obtained, but there is no limitation to this. A configuration is also possible, for example, in which the imaging unit 16 captures images of the second vehicle 102 and the road Rd at the same time, and the ratio of the width of the second vehicle 102 to the width of the road Rd is found on the captured images, and the road width at the position P1 detected by the position detection unit is substituted and the value obtained by multiplying the above-mentioned ratio and the road width is used as the width Wb of the second vehicle 102. Alternatively, if a laser radar or the like is mounted in the first vehicle 101, the width of the second vehicle 102 may be found by scanning the second vehicle 102 by the laser radar.

Also, in this configuration, the control unit 11 and the vehicle-to-vehicle communication unit 13 function as an example of the second speed detection unit 51C, and have a function of detecting (specifically, obtaining through the vehicle-to-vehicle communication) the speed of the second vehicle 102.

Note, that the example of the second speed detection unit is not limited to this example. A known speed detection device for detecting the speed of an external object (specifically, a known device capable of detecting the speed of an oncoming object) may be mounted in the first vehicle 101, and the speed Vb of the second vehicle 102 may be detected with use of such device, for example.

Figure 5:
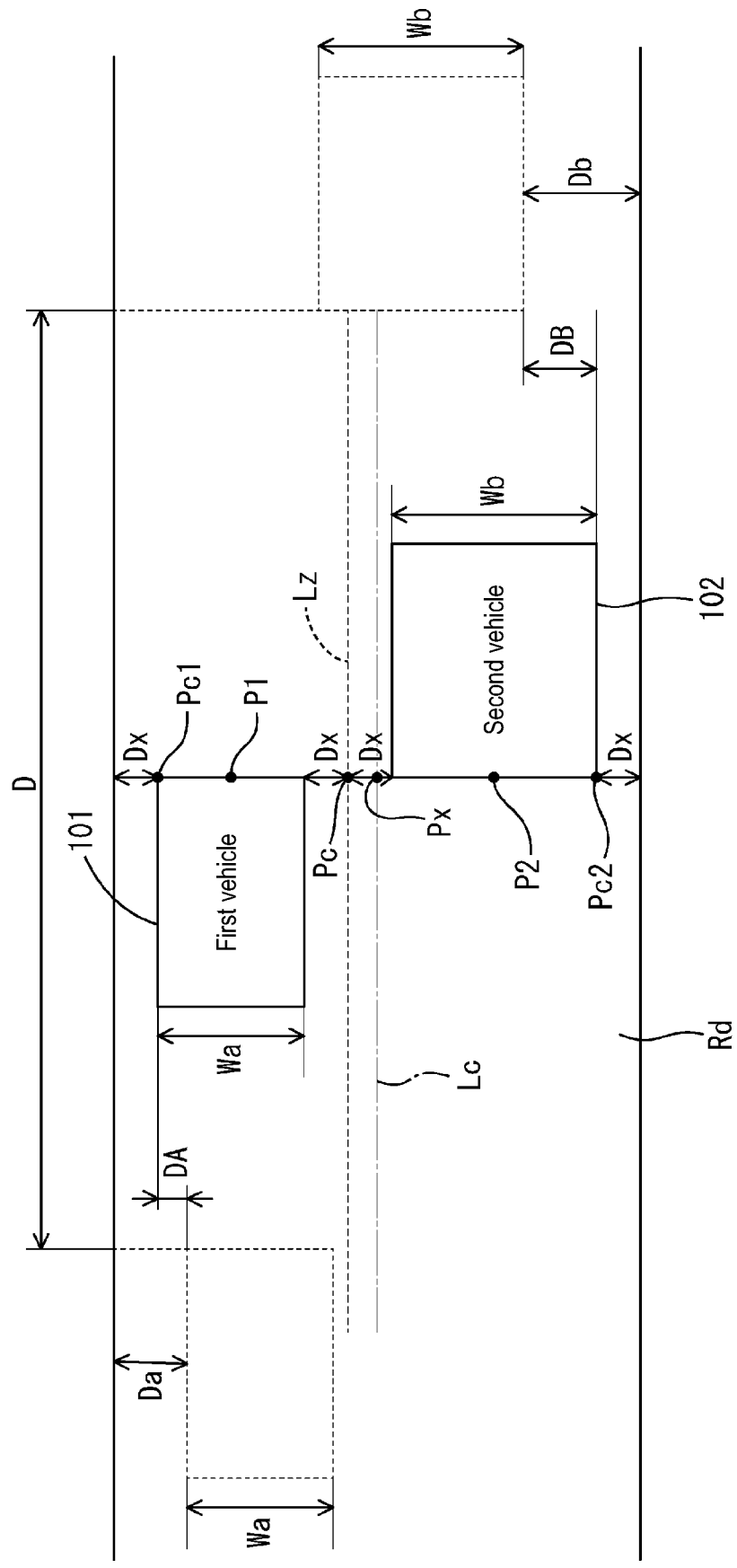
FIG. 5 is a diagram illustrating a state when the first vehicle and the second vehicle pass each other.

The control unit 11 calculates the passing position in step S5 after step S4. Specifically, through the processing in step S3, the position P1 of the first vehicle 101 and the position P2 of the second vehicle 102 are specified, and therefore the distance D between the position P1 and the position P2 can be calculated. When S denotes the time period until the first vehicle 101 and the second vehicle 102 pass each other, the time period S can be calculated using the equation: $S=D/(Va+Vb)$. The speed Va of the first vehicle 101 and the speed Vb of the second vehicle 102 have been obtained in step S3. The distance L by which the first vehicle 101 advances from the position P1 to the passing position can be expressed by the equation $L=Va \times S$, and the position Px where the first vehicle advances from the position Pr1 by the distance $Va \times S$ along the center line Lc is the passing position Px. The passing position Px is a position on the center line Lc of the road Rd, and when the vehicles pass each other, the position P1 of the first vehicle 101 and the position P2 of the second vehicle 102 are positioned on the straight line that passes through the position Px in the orthogonal direction (the direction orthogonal to the road direction at the position Px) as shown in FIG. 5.

In this configuration, the control unit 11 and the vehicle speed sensor 18 function as an example of the passing position prediction unit 51, and have a function of predicting the passing position Px of the first vehicle 101 and the second vehicle 102 in the traveling direction of the first vehicle 101. Specifically, the control unit 11 functions as an example of the inter-vehicle distance calculation unit 51A, and calculates the inter-vehicle distance D between the first vehicle 101 and the second vehicle 102 before the first vehicle 101 and the second vehicle 102 pass each other. Thereafter, the control unit 11 functions as an example of the position information calculation unit 51D, and calculates the position information indicating the passing position Px on the basis of the inter-vehicle distance D calculated by the inter-vehicle distance calculation unit 51A, the speed Va of the first vehicle 101 detected by the first speed detection unit 51B, and the speed Vb of the second vehicle 102 detected by the second speed detection unit 51C. Note, that in the above-described example, information such as the time S and the distance L is the position information indicating the passing position Px.

After calculating the passing position Px in step S5, in step S6, the control unit 11 estimates the state in which the vehicles pass each other. Specifically, the control unit 11 specifies the road width Wx at the passing position Px on the basis of the above-mentioned roadmap data, and finds the surplus width Dy at the passing position using the following equation: Dy=Wx−(Wa+Wb)−(Da+Db).

After performing calculation in this manner in step S6, in step S7, the control unit 11 determines whether or not it is difficult for the vehicles to pass each other. Specifically, the control unit 11 compares the surplus width Dy obtained in step S6 with a predetermined threshold value Dz (threshold value that defines a sufficient surplus width) in step S7, and determines whether Dy<Dz is satisfied. If Dy<Dz is satisfied, it is determined that passing is difficult, and the processing moves to Yes in step S7, and ends the control in FIG. 3.

In this configuration, the control unit 11 functions as an example of the road width specification unit 55, and has a function of specifying the road width Wx at the passing position Px predicted by the passing position prediction unit 51.

In this configuration, the control unit 11 functions as an example of the determination unit 57, and determines whether the first vehicle 101 and the second vehicle 102 will be in a predetermined state in which the vehicles can pass each other at the passing position Px (specifically, whether or not the vehicles will be in a state in which the surplus width having at least the sufficient surplus width Dz can be ensured when the vehicles pass each other), on the basis of the width Wa of the first vehicle 101 specified by the first width information obtained by the first width information obtaining unit 53, the width of the second vehicle 102 specified by the second width information obtained by the second width information obtaining unit, the passing position Px predicted by the passing position prediction unit, and the road width (the road width Wx at the passing position Px) specified by the road width specification unit 55.

If the processing moves to Yes in step S7, in other words, if the determination unit determines that the vehicles will not be in a predetermined state in which the vehicles can pass each other, the notification unit 17 may give a notification in accordance with the determination result from the determination unit. A warning message such as "passing is difficult" may be displayed on the display device or an audio message may be emitted, or a buzzer may be sounded by a predetermined sounding method and then a lamp may be lit by a predetermined displaying method, for example.

If the control unit 11 determines in step S7 that Dy<Dz is not satisfied, in other words, that it is not difficult for the vehicles to pass each other (step S7: No), then, in step S8,
the control unit 11 calculates the center position Pc in consideration of the widths of the first vehicle 101 and second vehicle 102 (position of a virtual centerline in consideration of the widths of vehicles) on a virtual line Lz that runs in the width direction and passes through the passing position Px.

If Wx denotes the road width at the passing position Px and Dc denotes the remainder obtained by subtracting the widths Wa and Wb of the two vehicles from the road width Wx, then Dc=W−(Wa+Wb). If the remainder Dc is equally allocated to four positions, namely the two sides of the first vehicle 101 and the two sides of the second vehicle 102 and Dx denotes the allocated amount for each position, then Dx=Dc/4. The center position Pc in consideration of the widths of the two vehicles at the passing position Px (virtual centerline in consideration of the widths) shows a relationship as shown in FIG. 5, and the width between the road edge on the first vehicle 101 side and the center position Pc is Wa+2×Dx. Also, the width between the road edge on the second vehicle 102 side and the center position Pc is Wb+2×Dx.

After step S8, in step S9, the control unit 11 calculates the left yield amount DA of the first vehicle 101 and the left yield amount DB of the second vehicle 102. Specifically, the left yield amount DA of the first vehicle 101 is calculated as DA=Da−Dx, and the left yield amount DB of the second vehicle 102 is calculated as DB=Db−Dx. Note, that the left yield amount DB of the second vehicle 102 may be transmitted to the second vehicle through the vehicle-to-vehicle communication between the vehicle-to-vehicle communication unit 13 and the vehicle-to-vehicle communication unit 23.

In this configuration, the control unit 11 functions as an example of the yield amount calculation unit 56, and has a function of calculating the yield amount DA of the first vehicle 101 on the basis of the width Wa of the first vehicle 101 specified by the first width information obtained by the first position detection unit, the width Wb of the second vehicle 102 specified by the second vehicle width information obtained by the second vehicle width information obtaining unit, the current position of the first vehicle 101 detected by the first position detection unit, and the passing position Px predicted by the passing position prediction unit, and the road width Wx specified by the road width specification unit. Specifically, the yield amount calculation unit calculates the yield amount DA of the first vehicle 101 using the equation DA=Da−Dc/4 on the basis of the remainder value Dc obtained by subtracting the width Wa of the first vehicle 101 and the width Wb of the second vehicle 102 from the road width Wx at the passing position, and the first current width Da detected by the first position detection unit.

After step S9, in step S10, the control unit 11 causes the notification unit 17 to give a notification. Specifically, the control unit 11 causes the notification unit 17 to give a notification such that the calculated yield amount DA of the first vehicle 101 can be recognized by the driver. A message saying "move to the left by the yield amount DA before passing the oncoming vehicle" may be displayed on the display device mounted in the first vehicle 101, or such a message may be given by audio, for example. In the first vehicle 101, the notification unit 17 gives notice of the yield amount DA of the first vehicle 101 on the basis of the calculation result from the yield amount calculation unit.

Next, the control performed in the second vehicle 102 will be described in detail.

As described above, in this driving assistance system 1, the same control as in FIG. 3 is performed by the control unit 21 of the second vehicle 102 as well as the control unit of the first vehicle 101. The oncoming vehicle (communication partner) for the second vehicle 102 performing the same control as in FIG. 3 is the first vehicle 101. The flow when performing the same processing (first to fourth processing) as in steps S1 to S4 with the control unit 21 of the second vehicle 102, is as described above.

After performing the same processing as in steps S1 to S4 shown in FIG. 3, the control unit 21 of the second vehicle 102 performs the same processing (fifth processing) as in step S5, and calculates the passing position Px by the same method as performed by the control unit 11 of the first vehicle 101. In this case, the control unit 21 may function as the passing position prediction unit.

After calculating the passing position Px by the same processing as in step S5 (fifth processing), the control unit 21 performs the same processing as in step S6 (sixth processing), and estimates the state in which the vehicles pass each other. Specifically, after finding the surplus width Dy by the same method as the control unit 11 in the sixth processing, the control unit 21 performs the same seventh processing as in step S7, compares the surplus width Dy with a predetermined threshold value (threshold value defining the enough surplus width) Dz, and determines whether Dy<Dz is satisfied. If Dy<Dz is satisfied, then the control unit 21 determines that it is difficult for the vehicles to pass each other, moves to Yes in the seventh processing, and ends the control, as in FIG. 3. If passing is determined to be difficult for the vehicles in the above-described seventh processing, the control unit 21 may cause the notification unit 27 to give a notification. In this case, for example, a message saying "passing is difficult" may be displayed on the display device, audio may be emitted, or a buzzer may be sounded by a predetermined sounding method then a lamp may be lit by a predetermined displaying method.

If it is determined in the above-described seventh processing that Dy<Dz is not satisfied, in other words, if it is determined that passing is not difficult (the seventh processing: No), then the control unit 21 performs the same processing (eighth processing) as in step S8, and calculates the center position Pc (virtual position of the centerline in consideration of the widths) by the same method as the control unit 11. After the eighth processing, the control unit 21 performs the same processing (ninth processing) as in step S9, and calculates the left yield amount DA of the first vehicle 101 and the left yield amount DB of the second vehicle 102. Specifically, the left yield amount DA of the first vehicle 101 is calculated as DA=Da−Dx, and the left yield amount DB of the second vehicle 102 is calculated as DB=Db−Dx, based on the equations DC=Wx−(Wa+Wb) and Dx=Dc/4. Note, that the left yield amount DA of the first vehicle 101 may be transmitted to the first vehicle 101 through the vehicle-to-vehicle communication between the vehicle-to-vehicle communication unit 13 and the vehicle-to-vehicle communication unit 23.

In this example, the control unit 21 functions as an example of the second position detection unit 62, and detects the current position of the second vehicle 102 using the same method as the method for detecting the current position of the first vehicle 101 by the first position detection unit 52. The second position detection unit 62 has a function of detecting the current position of the first vehicle 101 in the width direction of the road Rd before the first vehicle 101 and the second vehicle 102 pass each other. Specifically, in the above-described third processing, the second position detection unit 62 detects the second current width Db, which is a distance from the second vehicle 102 to the edge Pr22 in the width direction of the road Rd on the side of the second vehicle 102 (specifically, the distance in the width direction to the width-direction edge Pc2).

The control unit 21 functions as an example of the second yield amount calculation unit 66, and calculates the yield amount DB of the second vehicle 102 on the basis of the width Wa of the first vehicle 101 specified by the first width information obtained by the first width information obtaining unit 53, the width Wb of the second vehicle 102 specified by the second width information obtained by the second width information obtaining unit 54, the current position of the second vehicle 102 in the width direction detected by the second position detection unit 62, the passing position Px predicted by the passing position prediction unit 51, and the road width Wx specified by the road width specification unit 55. Specifically, the second yield amount calculation unit 66 calculates the yield amount DB of the second vehicle 102 using the equation DB=Db−Dc/4 on the basis of the remainder value Dc obtained by subtracting the width Wa of the first vehicle 101 and the width Wb of the second vehicle 102 from the road width Wx at the passing position Px, and the second current width Db detected by the second position detection unit.

When the control unit 21 functions as an example of the second yield amount calculation unit 66, the control unit 21 may obtain the width Wa of the first vehicle 101 specified by the first width information obtained by the first width information obtaining unit 53, the width Wb of the second vehicle 102 specified by the second width information obtained by the second width information obtaining unit 54, the passing position Px predicted by the passing position prediction unit 51, and the road width Wx specified by the road width specification unit 55, through the vehicle-to-vehicle communication between the first vehicle 101 and the second vehicle 102. Alternatively, a configuration is also possible in which the vehicle 102 is provided with units that function similarly to the first width information obtaining unit 53, the second width information obtaining unit 54, the road width specification unit 55, and the passing position prediction unit 51 such that the second vehicle 102 can independently obtain the width Wa of the first vehicle 101, the width Wb of the second vehicle 102, the passing position Px, and the road width Wx.

After performing the ninth processing, the control unit 21 performs processing (tenth processing) that is the same as in step S10, and causes the notification unit 27 to perform a notification operation. The second notification unit 27 gives notice of the yield amount of the second vehicle 102 in the second vehicle 102, based on the calculation result that was obtained in the ninth processing by the second yield amount calculation unit. A message saying "move to the left by the yield amount DB before passing the oncoming vehicle" may be displayed on the display device mounted in the second vehicle 102, or such a message may be given by audio, for example.

Hereinafter, the effect of the above-described configuration will be illustrated.

In the driving assistance system 1 and the driving assistance device 10, the yield amount calculation unit 56 calculates the yield amount DA of the first vehicle 101 on the basis of the width Wa of the first vehicle 101 specified by the first width information obtained by the first width information obtaining unit 53, the width Wb of the second vehicle 102 specified by the second width information obtained by the second width information obtaining unit 54, the current position of the first vehicle 101 in the width direction detected by the first position detection unit 52, the passing position Px predicted by the passing position prediction unit 51, and the road width Wx specified by the road width specification unit 55.

Specifying the road width Wx at the position where the first vehicle 101 and the second vehicle 102 pass each other the width Wa of the first vehicle 101, and the width Wb of the second vehicle 102 makes it possible to estimate the state (especially, the position in the width direction) of the first vehicle 101 when the vehicles pass each other. As such, obtaining such information (information from which the state of the first vehicle 101 at the time of the vehicles passing each other can be obtained) and the current position of the first vehicle 101 in the width direction detected by the first position detection unit 52 makes it possible to calculate, more accurately, the amount (the yield amount of the first vehicle 101) indicating the extent by which the first vehicle 101 should move to the side (yield) while it moves from the current position to the passing position. Accordingly, it is possible to notify the driver in the first vehicle 101 of this yield amount.

The passing position prediction unit includes the inter-vehicle distance calculation unit 51A for calculating the inter-vehicle distance D between the first vehicle 101 and the second vehicle 102, the first speed detection unit 51B for detecting the speed Va of the first vehicle 101, the second speed detection unit 51C for detecting the speed Vb of the second vehicle 102, and the position information calculation unit 51D for calculating position information indicating the passing position, on the basis of the inter-vehicle distance D calculated by the inter-vehicle distance calculation unit 51A, the speed Va of the first vehicle 101 detected by the first speed detection unit 51B, the speed Vb of the second vehicle 102 detected by the second speed detection unit 51C, before the first vehicle 101 and the second vehicle 102 pass each other.

In this manner, the passing position prediction unit obtains the inter-vehicle distance D between the first vehicle 101 and the second vehicle 102 and then estimates the passing position Px. Accordingly, it is possible to specify the position where the first vehicle 101 and the second vehicle 102 pass each other more accurately. As a result, the road width specification unit 55 can calculate the road width at the passing position more accurately, and the yield amount calculation unit 56 can calculate the yield amount of the first vehicle 101 more accurately.

The driving assistance system 1 and the driving assistance device 10 have the determination unit 57 for determining whether or not the first vehicle 101 and the second vehicle 102 will be in a predetermined state in which the vehicles can pass each other, at the passing position, on the basis of the width Wa of the first vehicle 101 specified by the first width information obtained by the first width information obtaining unit 53, the width Wb of the second vehicle 102 specified by the second width information obtained by the second width information obtaining unit 54, the passing position Px predicted by the passing position prediction unit 51, and the road width Wx specified by the road width specification unit 55. The notification unit 17 gives a notification in accordance with the determination result from the determination unit 57, at least if the determination unit 57 determines that the vehicles will not be in a predetermined state in which the vehicles can pass each other.

With the driving assistance system 1 and the driving assistance device 10 configured as above, the determination unit 57 can determine, more accurately, whether or not the first vehicle 101 and the second vehicle 102 will be in a predetermined state in which the vehicles can pass each other, and the notification unit 17 can give notice of this result. If the vehicles will not be in a predetermined state in which the vehicles can pass each other, a notification thereof is given, and therefore the driver who perceives this notification can readily take an appropriate action.

The first position detection unit 52 detects the first current width Da that is a distance between the first vehicle 101 and the edge Pr11 of the road in the width direction on the side of the first vehicle 101, before the first vehicle 101 and the second vehicle 102 pass each other. The yield amount calculation unit 56 calculates the yield amount DA of the first vehicle 101 on the basis of the remainder value Dc obtained by subtracting the width Wa of the first vehicle 101 and the width Wb of the second vehicle 102 from the road width Wx at the passing position Px, and the first current width Da detected by the first position detection unit.

With the driving assistance system 1 configured as above, the first position detection unit 52 can detect the first current width Da (distance from the first vehicle 101 and the edge of the road in the width direction on the side of the first vehicle 101) before the first vehicle 101 and the second vehicle 102 pass each other. Accordingly, the yield amount calculation unit 56 can calculate the yield amount DA of the first vehicle 101 more accurately, on the basis of the amount of remaining space when the vehicles pass each other (the remainder value Dc obtained by subtracting the width Wa of the first vehicle 101 and the width Wb of the second vehicle 102 from the road width Wx at the passing position Px) after obtaining more accurately the distance between the road edge and the first vehicle 101 before the vehicles pass each other.

The driving assistance system 1 includes the second position detection unit 62 for detecting the current position of the second vehicle 102 in the width direction of the road before the first vehicle 101 and the second vehicle pass each other, the second yield amount calculation unit 66 for calculating the yield amount DB of the second vehicle 102 on the basis of the width Wa of the first vehicle 101 specified by the first width information obtained by the first width information obtaining unit 53, the width Wb of the second vehicle 102 specified by the second width information obtained by the second width information obtaining unit 54, the current position of the second vehicle 102 in the width direction detected by the second position detection unit 62, the passing position Px predicted by the passing position prediction unit 51, the road width Wx specified by the road width specification unit 55, and the notification unit 27 (the second notification unit) for announcing the yield amount of the second vehicle 102 at least in the second vehicle 102, on the basis of the calculation result from the second yield amount calculation unit 66.

Specifying the road width Wx at the position Px where the first vehicle 101 and the second vehicle 102 pass each other, the width Wa of the first vehicle 101, and the width Wb of the second vehicle 102 makes it possible to estimate the state (especially, the position in the width direction) of the second vehicle 102 when the vehicles pass each other. Obtaining this information (information from which the state of the second vehicle 102 when the vehicles pass each other can be grasped) and the current position of the second vehicle 102 in the width direction detected by the second position detection unit 62 makes it possible to calculate more accurately the amount indicating the extent (the yield amount DB of the second vehicle 102) by which the second vehicle should move to the side while it goes from the current position to the passing position. Accordingly, it is possible to notify the driver in the second vehicle 102 of this yield amount DB.

The second position detection unit 62 detects the second current width Db, which is the distance between the second vehicle 102 and the edge Pr22 in the width direction of the road on the side of the second vehicle 102, before the first vehicle 101 and the second vehicle 102 pass each other. The second yield amount calculation unit 66 calculates the yield amount DB of the second vehicle 102 on the basis of the remainder value Dc obtained by subtracting the width Wa of the first vehicle 101 and the width Wb of the second vehicle 102 from the road width Wx at the passing position Px, and the second current width Db detected by the second position detection unit.

With the driving assistance system 1 configured as above, the second position detection unit can detect the second current width Db (distance from the second vehicle 102 to the edge of the road in the width direction on the side of the second vehicle 102) before the first vehicle 101 and the second vehicle 102 pass each other. The second yield amount calculation unit 66 can calculate the yield amount DB of the second vehicle 102 more accurately, on the basis of the amount of remaining space when the vehicles pass each other (the remainder value Dc obtained by subtracting the width Wa of the first vehicle 101 and the width Wb of the second vehicle 102 from the road width Wx at the passing position Px) after obtaining, more accurately, the distance between the road edge and the second vehicle 102 before the vehicles pass each other.

Other Embodiments

The present disclosure is not limited to the embodiments illustrated using the above descriptions and drawings. The following embodiments are also encompassed within the technical scope of the present disclosure, for example.

In the above-described embodiments, the wireless communication unit 12 and the vehicle-to-vehicle communication unit 13 are configured as separate devices, but these units can also be configured as one device. In other words, the wireless communication unit 12 may perform wireless communication (vehicle-to-vehicle communication) with the wireless communication unit 22 or the vehicle-to-vehicle communication unit 23 of the second vehicle 102 directly or indirectly via an external device.

In Embodiment 1, the vehicle speed sensor 18 was illustrated as an example of the first speed detection unit, but there is no limitation to this example as long as the device can detect a value indicative of the speed of the first vehicle 101. The first speed detection unit may also be constituted by a wheel speed sensor, an acceleration sensor, or the like, for example. When the speed of the first vehicle 101 is to be obtained by the first vehicle 101, it is sufficient for the vehicle speed sensor 18 to function as the first speed detection unit, and when the speed of the second vehicle 102 is to be obtained by the second vehicle 102, the control unit 21 and vehicle-to-vehicle communication unit 23 of the second vehicle 102 can function as the first speed detection unit (unit for obtaining the speed information detected by the vehicle speed sensor 18 from the first vehicle 101). Similarly, when the speed of the second vehicle 102 is to be obtained by the second vehicle 102, it is sufficient for the vehicle speed sensor 28 to function as the second speed detection unit, and when the speed of the second vehicle 102 is to be obtained by the first vehicle 101, the control unit 11 and the vehicle-to-vehicle communication unit 13 of the first vehicle 101 can function as the second speed detection unit (unit for obtaining the speed information detected by the vehicle speed sensor 28 from the second vehicle 102).

In Embodiment 1, an example was illustrated in which assistance is performed on the assumption that the second vehicle 102 cooperatively moves over to the left, however, assistance may also be performed on the assumption that the second vehicle 102 does not cooperate. A configuration is also possible in which, for example, the distance Db between the second vehicle 102 and the road edge may be obtained on the basis of the current position P2 of the second vehicle 102 obtained in step S4 in FIG. 3 and the width Wb of the second vehicle 102, and assistance may be performed on the assumption that the above-described Db is kept when the vehicles pass each other. In this case, the passing position Px and the road width Wx at the passing position Px may be calculated by a method that is similar to that in Embodiment 1, and the width Dx (distance between the first vehicle 101 and the road edge) that should be kept when the vehicles pass each other may be calculated using the equation Wx=Wa+Wb+Db+Dx×3, and the yield amount DA may be calculated using the equation DA=Da−Dx.

In Embodiment 1, a method based on GPS information was illustrated as the method for obtaining the current position of the first vehicle 101 in the width direction of the road Rd by the control unit 11. However, the current position of the first vehicle 101 on the road in the width direction may also be obtained from images of the road captured by a camera mounted in the first vehicle 101. Specifically, the right edge position and the left edge position of the road in the captured image vary depending on the position of the first vehicle 101 in the width direction, and the ratio of the position of the first vehicle 101 to the road may be obtained. Then, the width Da between the left edge of the first vehicle 101 and the edge of the road may be obtained on the basis of the road width at the current position obtained from the roadmap data.

In Embodiment 1, a method for obtaining information through the vehicle-to-vehicle communication was illustrated as a method for obtaining the current position of the second vehicle 102. However, the current position (specifically, the above-described value Db) of the second vehicle 102 in the width direction of the road may also be obtained from the images of the road and the second vehicle 102 captured by a camera mounted in the first vehicle 101. The position P2 of the second vehicle 102 may be obtained by finding the distance D from the first vehicle 101 to the second vehicle 102 using a known distance measuring device, and the road width at the position P2 of the second vehicle 102 may be specified based on the map data, for example. By doing so, the actual width of the road area in the captured image of the road and the second vehicle 102 can be determined, and the actual width (i.e. Db) between the second vehicle 102 and the road edge can also be determined.

The invention claimed is:
1. A driving assistance system including:
   a first width information obtaining unit for obtaining first width information that specifies a width of a first vehicle;
   a second width information obtaining unit for obtaining second width information that specifies a width of a second vehicle, which is to be passed by the oncoming first vehicle;
   a passing position prediction unit for predicting a passing position of the first vehicle and the second vehicle in a travelling direction of the first vehicle on a road on which the first vehicle and the second vehicle run;

a first position detection unit for detecting a first current width that is a distance from the first vehicle to the edge in the width direction of the road on the side of the first vehicle, before the first vehicle and the second vehicle pass each other;

a road width specification unit for specifying a road width at the passing position predicted by the passing position prediction unit;

a yield amount calculation unit for calculating a yield amount ("DA") of the first vehicle using the following equation:

$$DA = Da - Dc/4;$$

wherein "Da" is the first current width detected by the first position detection unit;

and wherein $Dc = W - (Wa + Wb)$, wherein "W" is the road width, "Wa" is the width of the first vehicle and "Wb" is the width of the second vehicle; and a notification unit for giving notification of the yield amount of the first vehicle at least in the first vehicle on the basis of the calculation result from the yield amount calculation unit.

2. The driving assistance system according to claim 1, wherein the passing position prediction unit includes:

an inter-vehicle distance calculation unit for calculating an inter-vehicle distance between the first vehicle and the second vehicle before the first vehicle and the second vehicle pass each other;

a first speed detection unit for detecting the speed of the first vehicle;

a second speed detection unit for detecting the speed of the second vehicle;

a position information calculation unit for calculating position information indicating the passing position on the basis of the inter-vehicle distance calculated by the inter-vehicle distance calculation unit, the speed of the first vehicle detected by the first speed detection unit, and the speed of the second vehicle detected by the second speed detection unit.

3. The driving assistance system according to claim 1, further including:

a determination unit for determining whether the first vehicle and the second vehicle will be in a predetermined state in which the first vehicle and the second vehicle can pass each other at the passing position, on the basis of the width of the first vehicle specified by the first width information obtained by the first information obtaining unit, the width of the second vehicle specified by the second width information obtained by the second information obtaining unit, the passing position predicted by the passing position prediction unit, and the road width specified by the road width specification unit, and the notification unit gives a notification in accordance with the determination result from the determination unit at least if the determination unit determines that the first vehicle and the second vehicle cannot pass each other at the passing position.

4. The driving assistance system according to claim 1, including:

a second position detection unit for detecting a second current width that is a distance from the second vehicle to the edge in the width direction of the road on the side of the second vehicle, before the second vehicle and second vehicle pass each other;

a second yield amount calculation unit for calculating a yield amount ("DB") of the second vehicle using the following equation:

$$DB = Db - Dx/4;$$

wherein "Db" is the second current width detected by the second position detection unit, and $Dx = Dc/4$, and a second notification unit for giving notification of the yield amount of the second vehicle, at least in the second vehicle, on the basis of the calculation result from the second yield amount calculation unit.

5. The driving assistance system according to claim 2, further including:

a determination unit for determining whether the first vehicle and the second vehicle will be in a predetermined state in which the first vehicle and the second vehicle can pass each other at the passing position, on the basis of the width of the first vehicle specified by the first width information obtained by the first information obtaining unit, the width of the second vehicle specified by the second width information obtained by the second information obtaining unit, the passing position predicted by the passing position prediction unit, and the road width specified by the road width specification unit, and the notification unit gives a notification in accordance with the determination result from the determination unit at least if the determination unit determines that the first vehicle and the second vehicle cannot pass each other at the passing position.

6. A driving assistance device including:

a first width information obtaining unit for obtaining first width information that specifies a width of a first vehicle;

a second width information for obtaining second width information that specifies a width of a second vehicle, which is to be passed by the oncoming first vehicle;

a passing position prediction unit for predicting a passing position of the first vehicle and the second vehicle in a travelling direction of the first vehicle on a road on which the first vehicle and the second vehicle run;

a first position detection unit for detecting a first current width that is a distance from the first vehicle to the edge in the width direction of the road on the side of the first vehicle, before the first vehicle and the second vehicle pass each other;

a road width specification unit for specifying the road width at the passing position predicted by the passing position prediction unit;

a yield amount calculation unit for calculating a yield amount ("DA") of the first vehicle using the following equation:

$$DA = Da - Dc/4;$$

wherein "Da" is the first current width detected by the first position detection unit;

and wherein $Dc = W - (Wa + Wb)$, wherein "W" is the road width, "Wa" is the width of the first vehicle and "Wb" is the width of the second vehicle; and a notification unit for giving notification of the yield amount of the first vehicle at least in the first vehicle on the basis of the calculation result from the yield amount calculation unit.

7. The driving assistance device according to claim 6, wherein the passing position prediction unit includes:

an inter-vehicle distance calculation unit for calculating an inter-vehicle distance between the first vehicle and the second vehicle before the first vehicle and the second vehicle pass each other;

a first speed detection unit for detecting the speed of the first vehicle;

a second speed detection unit for detecting the speed of the second vehicle, and a position information calculation unit for calculating position information indicating the passing position on the basis of the inter-vehicle distance calculated by the inter-vehicle distance calculation unit, the speed of the first vehicle detected by the first speed detection unit, and the speed of the second vehicle detected by the second speed detection unit.

8. The driving assistance device according to claim 6, further including:

a determination unit for determining whether or not the first vehicle and the second vehicle will be in a predetermined state in which the first vehicle and the second vehicle can pass each other at the passing position, on the basis of the width of the first vehicle specified by the first width information obtained by the first width information obtaining unit, the width of the second vehicle specified by the second width information obtained by the second width information obtaining unit, the passing position predicted by the passing position prediction unit, and the road width specified by the road width specification unit, wherein the notification unit gives notification in accordance with the determination result from the determination unit at least if the determination unit determines that the first vehicle and the second vehicle will not be in a predetermined state in which the first vehicle and the second vehicle can pass each other.

9. The driving assistance device according to claim 7, further including:

a determination unit for determining whether or not the first vehicle and the second vehicle will be in a predetermined state in which the first vehicle and the second vehicle can pass each other at the passing position, on the basis of the width of the first vehicle specified by the first width information obtained by the first width information obtaining unit, the width of the second vehicle specified by the second width information obtained by the second width information obtaining unit, the passing position predicted by the passing position prediction unit, and the road width specified by the road width specification unit, wherein the notification unit gives notification in accordance with the determination result from the determination unit at least if the determination unit determines that the first vehicle and the second vehicle will not be in a predetermined state in which the first vehicle and the second vehicle can pass each other.

* * * * *